US009421992B2

(12) United States Patent
Mills

(10) Patent No.: US 9,421,992 B2
(45) Date of Patent: Aug. 23, 2016

(54) INFANT STROLLER AND SWING COMBINATION

(71) Applicant: Jeff Mills, Austin, TX (US)

(72) Inventor: Jeff Mills, Austin, TX (US)

( * ) Notice: Subject to any disclaimer, the term of this patent is extended or adjusted under 35 U.S.C. 154(b) by 32 days.

(21) Appl. No.: 14/519,094

(22) Filed: Oct. 20, 2014

(65) Prior Publication Data

US 2015/0042076 A1 Feb. 12, 2015

Related U.S. Application Data

(63) Continuation-in-part of application No. 13/901,066, filed on May 23, 2013, now abandoned.

(60) Provisional application No. 61/659,275, filed on Jun. 13, 2012.

(51) Int. Cl.
| | |
|---|---|
| B62B 9/22 | (2006.01) |
| B62B 7/14 | (2006.01) |
| B62B 9/08 | (2006.01) |
| B62B 7/06 | (2006.01) |
| B62B 7/04 | (2006.01) |

(52) U.S. Cl.
CPC . *B62B 7/145* (2013.01); *B62B 7/04* (2013.01); *B62B 7/06* (2013.01); *B62B 9/087* (2013.01); *B62B 9/22* (2013.01)

(58) Field of Classification Search
CPC ............ B62B 7/14; B62B 7/142; B62B 7/147
USPC ...................... 280/47.41, 47.38; 297/260, 274
See application file for complete search history.

(56) References Cited

U.S. PATENT DOCUMENTS

| 706,448 A | 8/1902 | Pender |
|---|---|---|
| 1,480,451 A | 1/1924 | Koch |

(Continued)

FOREIGN PATENT DOCUMENTS

| EP | 0808762 A1 | 11/1997 |
|---|---|---|
| GB | 2385027 A | 8/2003 |
| GB | 2493659 A | 2/2013 |

OTHER PUBLICATIONS

Stroller/baby rocker/rocker/909A; Alibaba.com; www.alibaba.com/product-gs/316785552/stroller_baby_rocker_909A; three pages; Mar. 8, 2012.

(Continued)

*Primary Examiner* — Jeffrey J Restifo
(74) *Attorney, Agent, or Firm* — John A. Fortkort; Fortkort & Houston PC

(57) ABSTRACT

A stroller (201) is provided which includes a chassis (203, 205) having first (211) and second (213) opposing frame elements. The chassis is supported on a plurality of wheels (223, 224, 225, 226). A seat (231) is suspended from the chassis by way of a support element (241). The seat includes upper (233) and lower (235) portions and is adapted to accommodate a child such that the back of the child rests against the upper portion and such that the legs of the child rest against the lower portion. The support element has first and second ends which are rotatably attached to first (243) and second (245) pivots mounted, respectively, on the first and second frame elements. The first pivot rotates about a first axis, and the seat is disposed between the first axis and the plurality of wheels. A first motor (271) is provided which rotates the first pivot.

20 Claims, 16 Drawing Sheets

(56) References Cited

U.S. PATENT DOCUMENTS

| | | | |
|---|---|---|---|
| 1,508,500 A | | 9/1924 | Bingen et al. |
| 1,952,467 A | | 3/1934 | Slee |
| D156,930 S | | 12/1949 | Wenpetren |
| 2,708,585 A | | 5/1955 | Games |
| 2,961,248 A | | 11/1960 | Meyers |
| 3,564,626 A | | 2/1971 | Nelson |
| 4,476,649 A | | 10/1984 | Zaruba |
| 5,099,528 A | | 3/1992 | Wadman |
| 5,201,535 A | * | 4/1993 | Kato ............... B62B 7/123 280/30 |
| D371,094 S | | 6/1996 | Hinkston |
| 5,562,548 A | * | 10/1996 | Pinch ............... A47D 13/105 297/256.12 |
| D377,466 S | | 1/1997 | Baesa |
| 5,676,386 A | * | 10/1997 | Huang ............... B62B 7/142 280/30 |
| 5,772,279 A | * | 6/1998 | Johnson, Jr. ......... B60N 2/2821 280/30 |
| 5,846,136 A | * | 12/1998 | Wu ............... A47D 13/105 472/119 |
| D408,768 S | | 4/1999 | Baechler et al. |
| 5,947,555 A | * | 9/1999 | Welsh, Jr. ............... B62B 7/142 280/30 |
| 5,987,665 A | | 11/1999 | Simantob et al. |
| 5,988,670 A | | 11/1999 | Song et al. |
| D442,895 S | | 5/2001 | Chiu |
| 6,250,654 B1 | * | 6/2001 | Willis ............... B62B 9/22 280/30 |
| 6,286,844 B1 | * | 9/2001 | Cone, II ............... B62B 9/28 280/47.41 |
| D452,195 S | | 12/2001 | Baechler |
| 6,471,597 B1 | * | 10/2002 | Flannery ............... A47D 13/105 297/273 |
| D475,951 S | | 6/2003 | Everett |
| D481,976 S | | 11/2003 | Everett |
| 6,671,926 B2 | | 1/2004 | Huang |
| D498,713 S | | 11/2004 | Chou |
| D498,714 S | | 11/2004 | Chou |
| 6,872,146 B1 | * | 3/2005 | Paesang ............... A47D 13/105 472/119 |
| 6,893,040 B2 | * | 5/2005 | Hou ............... B60N 2/2845 280/642 |
| D519,063 S | | 4/2006 | Chang |
| 7,037,205 B1 | | 5/2006 | Bowman |
| 7,100,724 B2 | | 9/2006 | Haigh |
| 7,354,352 B2 | * | 4/2008 | Keska ............... A47D 13/105 472/119 |
| 7,377,537 B2 | * | 5/2008 | Li ............... B62B 7/123 280/47.38 |
| 7,445,559 B2 | * | 11/2008 | Kakuda ............... A47D 13/105 297/273 |
| 7,475,942 B2 | * | 1/2009 | Boyle ............... A47D 13/105 297/273 |
| 7,497,461 B2 | | 3/2009 | Emerson |
| 7,607,734 B2 | * | 10/2009 | Clapper ............... A47D 13/105 297/260.2 |
| D604,055 S | | 11/2009 | Plested et al. |
| 7,681,894 B2 | * | 3/2010 | Santamaria ............... B62B 7/142 24/589.1 |
| 7,686,323 B2 | * | 3/2010 | Chen ............... B62B 7/142 280/47.38 |
| 7,694,996 B2 | * | 4/2010 | Saville ............... B62B 7/062 280/47.38 |
| D622,640 S | | 8/2010 | Gower et al. |
| 7,766,366 B2 | * | 8/2010 | Li ............... B62B 7/08 280/642 |
| D623,429 S | | 9/2010 | Plested et al. |
| 7,905,791 B2 | * | 3/2011 | Guang ............... B62B 7/08 340/671 |
| 7,938,435 B2 | * | 5/2011 | Sousa ............... B62B 7/142 280/47.4 |
| 8,029,014 B2 | * | 10/2011 | Ahnert ............... B62B 9/102 280/47.38 |
| 8,251,382 B2 | * | 8/2012 | Chen ............... B62B 7/142 280/47.38 |
| D667,229 S | | 9/2012 | Sturmey |
| 8,292,750 B2 | | 10/2012 | Gregorian |
| D682,562 S | | 5/2013 | Plested et al. |
| D684,789 S | | 6/2013 | Wilkinson |
| D687,352 S | | 8/2013 | Shellenberger et al. |
| 8,550,556 B2 | * | 10/2013 | Asbach ............... A47D 1/002 297/273 |
| 8,672,341 B2 | * | 3/2014 | Offord ............... B62B 7/062 280/47.38 |
| 8,746,794 B2 | * | 6/2014 | Oren ............... A47D 11/005 297/118 |
| 8,851,505 B2 | * | 10/2014 | Van Gelderen ......... B62B 7/145 280/657 |
| 8,944,927 B2 | * | 2/2015 | Huntsberger ............... A47D 13/105 297/281 |
| 8,955,869 B2 | * | 2/2015 | Zehfuss ............... B62B 7/008 280/642 |
| 9,085,312 B2 | * | 7/2015 | Liu ............... B62B 7/08 |
| D743,304 S | * | 11/2015 | Mills ............... B62B 7/08 D12/129 |
| 2001/0013689 A1 | | 8/2001 | Cone, II et al. |
| 2004/0212161 A1 | | 10/2004 | Haigh |
| 2006/0085953 A1 | | 4/2006 | Chen |
| 2007/0085302 A1 | | 4/2007 | You et al. |
| 2007/0120404 A1 | | 5/2007 | Bellows et al. |
| 2009/0029784 A1 | | 1/2009 | Gregorian |
| 2009/0181780 A1 | | 7/2009 | Myers |
| 2011/0278810 A1 | * | 11/2011 | Winterhalter ......... B60N 2/2848 280/47.38 |
| 2012/0023662 A1 | | 2/2012 | Larsson |
| 2012/0060326 A1 | | 3/2012 | Smith et al. |
| 2012/0235450 A1 | * | 9/2012 | Oren ............... A47D 13/102 297/183.6 |
| 2013/0334781 A1 | * | 12/2013 | Mills ............... A63G 9/02 280/47.41 |
| 2014/0042729 A1 | * | 2/2014 | Van Gelderen ......... B62B 7/145 280/650 |
| 2015/0008659 A1 | * | 1/2015 | Chang ............... B62B 7/08 280/650 |
| 2015/0042056 A1 | * | 2/2015 | Sparling ............... A62B 9/12 280/47.35 |
| 2015/0042076 A1 | * | 2/2015 | Mills ............... B62B 7/145 280/650 |
| 2015/0175189 A1 | | 6/2015 | Chowdhury |

OTHER PUBLICATIONS

Rocker+Baby Stroller; Alibaba.com; www.alibaba.com/product-gs1302843203/ROCKER_Baby_Stroller; three pages; Mar. 8, 2012.
Robopax Baby Rocker-Automatic Pram Buggie Push Chair Baby Rocker; www.amazon.co.uk/Robopax-Baby-Rocker-Automatic-Buggie/dp/B004DORTGM; five pages; Mar. 8, 2012.
Baby Carriage, Rocker, and High Chair Combined; Popular Mechanics, one page; Mar. 1925.
Graco Play Set Stroller with Canopy, Swing and High Chair Combination, Play gym, Baby Monitors and 3 Piece Accessories; www.newegg.com/Product/Product.aspx?Item=9SIA0AC03B3959; two pages; Apr. 9, 2012.
Lolaloo; www.lolaloo.com/en/index.html; one page; Mar. 8, 2012.
Blue Baby Stroller With Rocker; www.alibaba.com/produce-gs/493755050/Blue_Baby_Stroller_Withy_Rocker.html; three pages; Mar. 8, 2012.
Baby Stroller With Rocker; www.alibaba.com/product-gs/498578484/Baby_Stroller_With_Rocker.html; three pages; Mar. 8, 2012.
Baby stroller. Rocking ability. Compact-brings baby closer 2 parent. Folds easily. Lighter. Much higher-doubles as a highchair. Teamlab; www.quirky.com/ideations/193310; nine pages; Apr. 9, 2012.
Baby carrier, children's stroller, baby rocker; www.alibaba.com/product-gs/210011612/baby_carrier_children_s_stroller_baby.htlm; three pages; Mar. 8, 2012.
Owner's Instruction Manual; BOB Revolution Stroller SE, CE and Stroller Strides; Bob Trailers, Inc.; www.bobgear.com; 2010; 18 pages.

* cited by examiner

- Prior Art –

- *Prior Art* –

INFANT STROLLER AND SWING COMBINATION

CROSS-REFERENCE TO RELATED APPLICATIONS

This application is a continuation-in-part application of U.S. application Ser. No. 13/901,066, filed May 23, 2013, having the same title, and the same inventor, and which is incorporated herein by reference in its entirety; which application claims the benefit of priority from U.S. Application No. 61/659,275, filed Jun. 13, 2012, having the same title, and the same inventor, and which is incorporated herein in by reference in its entirety.

FIELD OF THE DISCLOSURE

The present disclosure relates generally to infant strollers, and more particularly to infant strollers that are also adapted to function as a swing.

BACKGROUND OF THE DISCLOSURE

Baby carriages or strollers are well known and have a long history in modern society. Indeed, the first stroller was invented in 1733 by the English architect William Kent for use by the children of the $3^{rd}$ Duke of Devonshire. Over the years, various improvements have been made to these devices. Many of these improvements have been concerned with making these devices more functional, durable, lighter, easier to manufacture, or easier to transport.

U.S. Pat. No. 6,250,654 (Willis) discloses an example of a more recent stroller. The device depicted therein is a car seat/stroller assembly with a frame that pivotally accepts an infant car seat. Once the car seat is positioned in the frame, it can rock freely in a back-and-forth motion. Other examples or strollers which have a similar functionality may be found in U.S. Pat. No. 706,448 (Pender), U.S. Pat. No. 1,480,451 (Koch), U.S. Pat. No. 1,508,500 (Bingen et al.), U.S. Pat. No. Pat. No. 3,564,626 (Nelson), U.S. Pat. No. 5,099,528 (Wadman), U.S. Pat. No. 5,987,665 (Simantob et al.), U.S. Pat. No. 6,250,654 (Willis), U.S. Pat. No. 7,037,205 (Bowman), U.S. Pat. No. 7,100,724 (Haigh), U.S. Pat. No. 7,497,461 (Emerson), and U.S. Pat. No. 156,390 (Wenpetren).

SUMMARY OF THE DISCLOSURE

In one aspect, a stroller is provided which comprises (a) a chassis having first and second opposing frame elements, wherein said chassis is supported on a plurality of wheels; (b) a seat suspended from said chassis by way of a support element, wherein said seat includes upper and lower portions and is adapted to accommodate a child such that the back of the child rests against the upper portion and such that the legs of the child rest against the lower portion, wherein said support element has first and second ends which are rotatably attached to first and second pivots mounted, respectively, on said first and second frame elements, wherein said first pivot rotates about a first axis, and wherein said seat is disposed between said first axis and said plurality of wheels; and (c) a first motor which rotates said first pivot.

DETAILED DESCRIPTION

While the devices disclosed in the prior art may be suitable for their intended purposes, these devices also suffer from various infirmities. In particular, many of these devices require manual operation, and hence are not well suited to hands-free operation by the caregiver of an infant. Other devices of this type are constructed as rocker/stroller combinations whose operation depends on the surface the device is positioned on. Still others are unduly complicated and difficult or expensive to manufacture. Furthermore, some devices, such as the device depicted in U.S. Pat. No. 6,250,654 (Willis), have an axis of rotation that is at or below the body of the infant. Such a disposition of the axis of rotation produces a rocking motion, rather than a swinging motion, that may be less conducive to relaxation for some infants.

It has now been found that the foregoing infirmities may be overcome with a stroller of the type disclosed herein. In a preferred embodiment, this stroller has a seat which swings about an axis of rotation which is disposed above the body of the infant. This axis of rotation preferably extends above the top of, and parallel to the back of, the stroller seat. Unlike the device of U.S. Pat. No. 6,250,654 (Willis), in which the axis of rotation is disposed at or below the body of the infant and hence produces a rocking motion, this disposition of the axis of rotation produces a swinging motion which is deemed more suitable to relaxation for some infants. It will be appreciated that this design allows the swinging motion of the seat to be decoupled from the nature of the surface the device is positioned upon. Moreover, this construction provides a stroller that provides a swinging motion and that is amenable to an uncomplicated design which may be operated easily and manufactured inexpensively.

Figure 1:
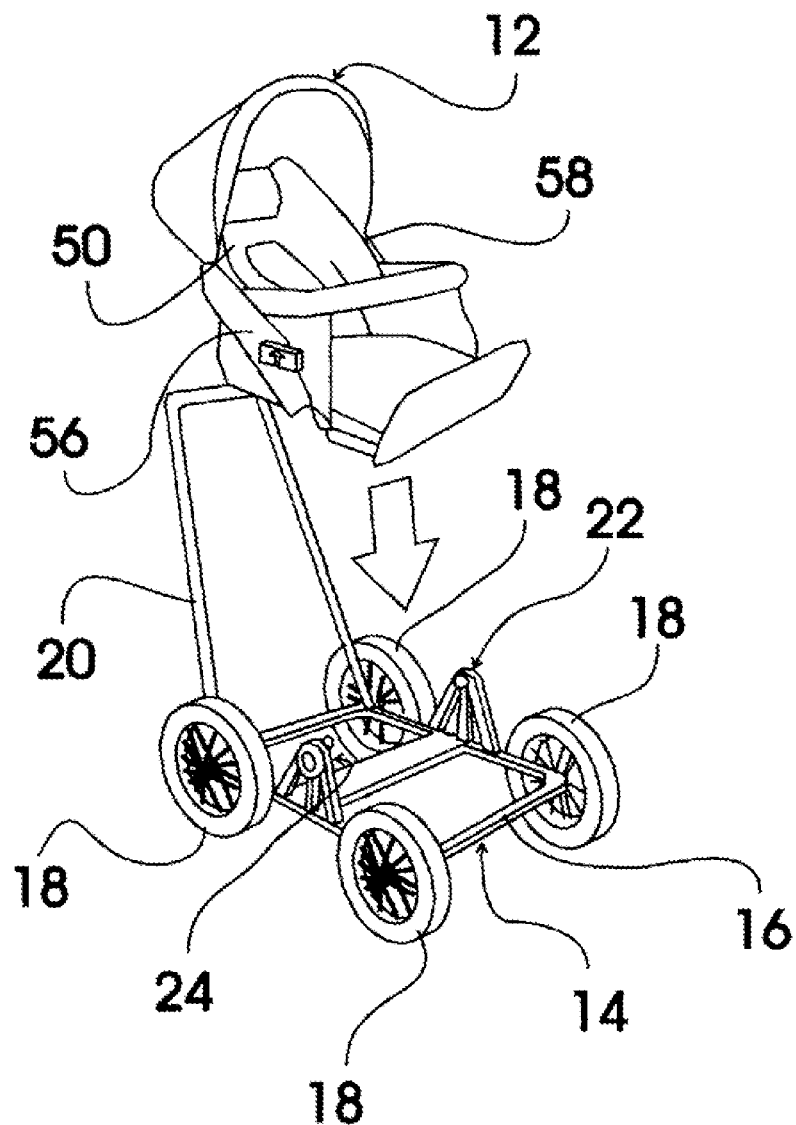
FIGS. 1-2 are illustrations of a prior art stroller.
Figure 2:
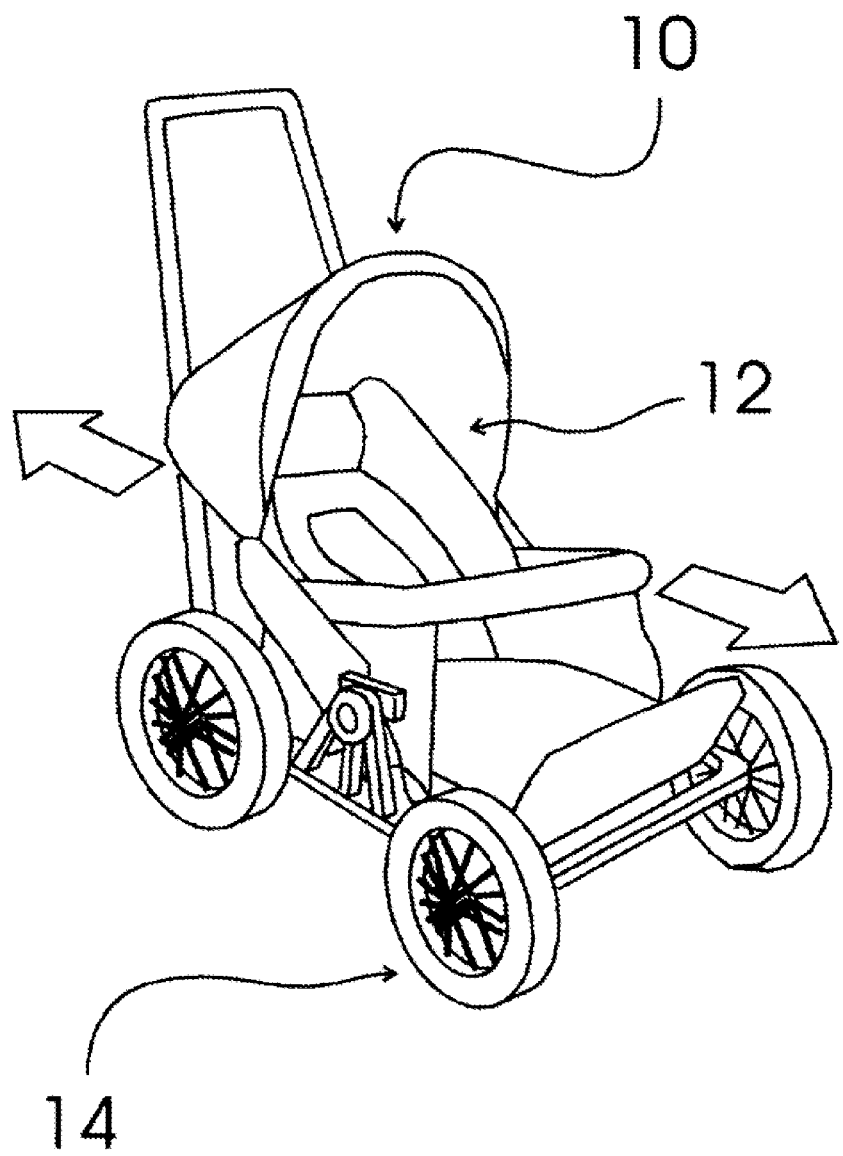
Figure 3:
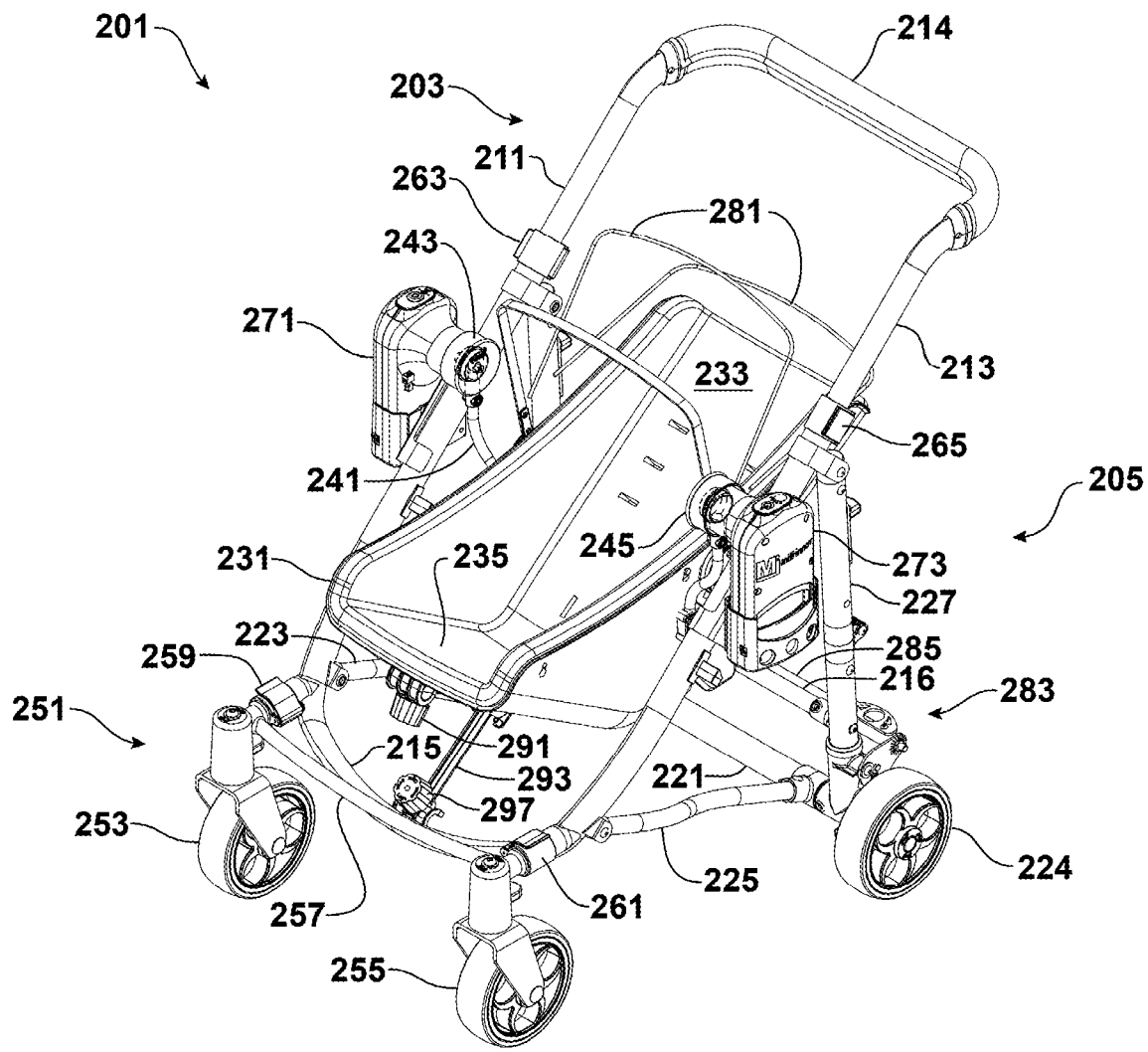
FIGS. 3-9 are illustrations of a first embodiment of a stroller in accordance with the teachings herein.
Figure 4:
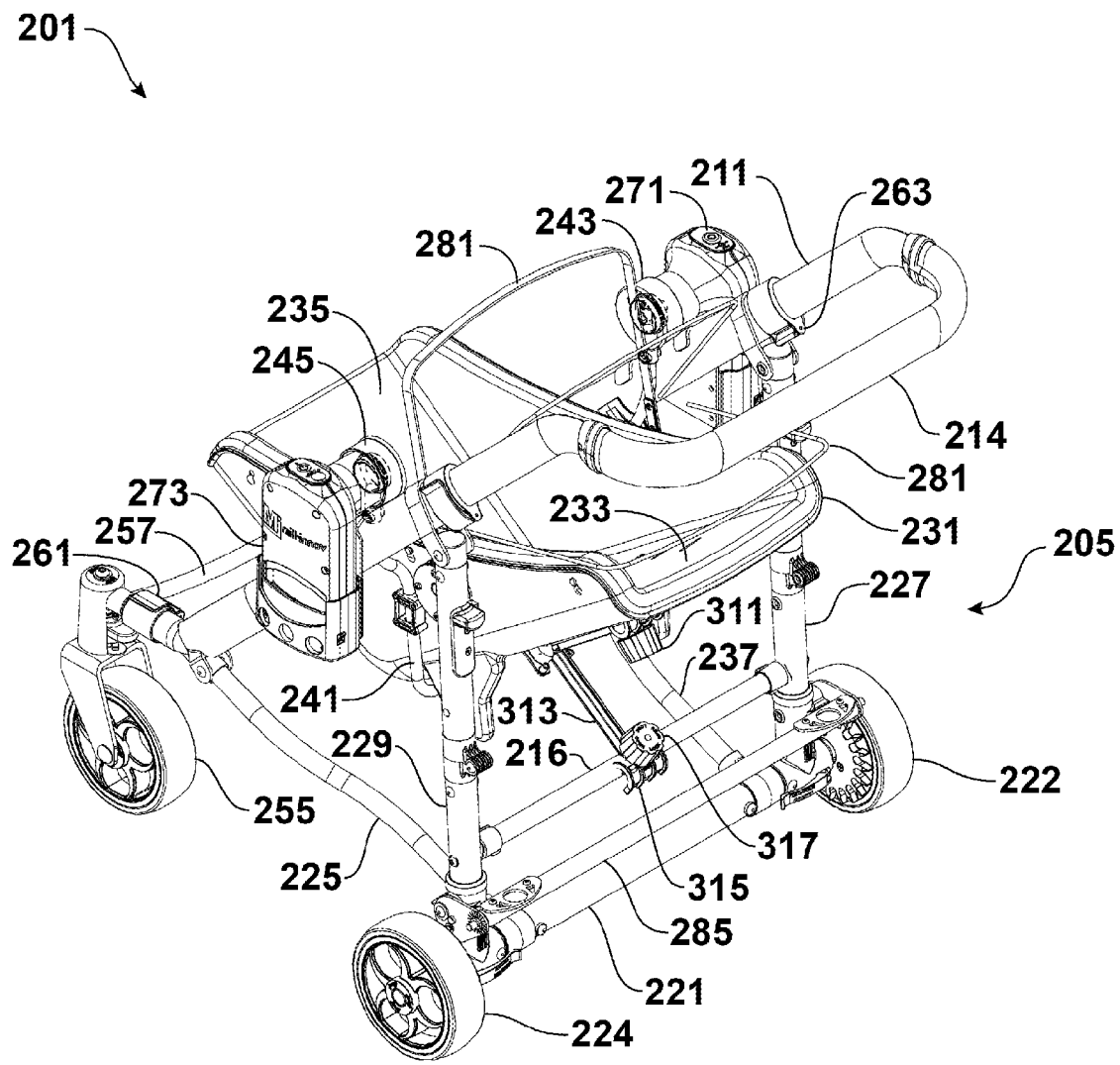
Figure 5:
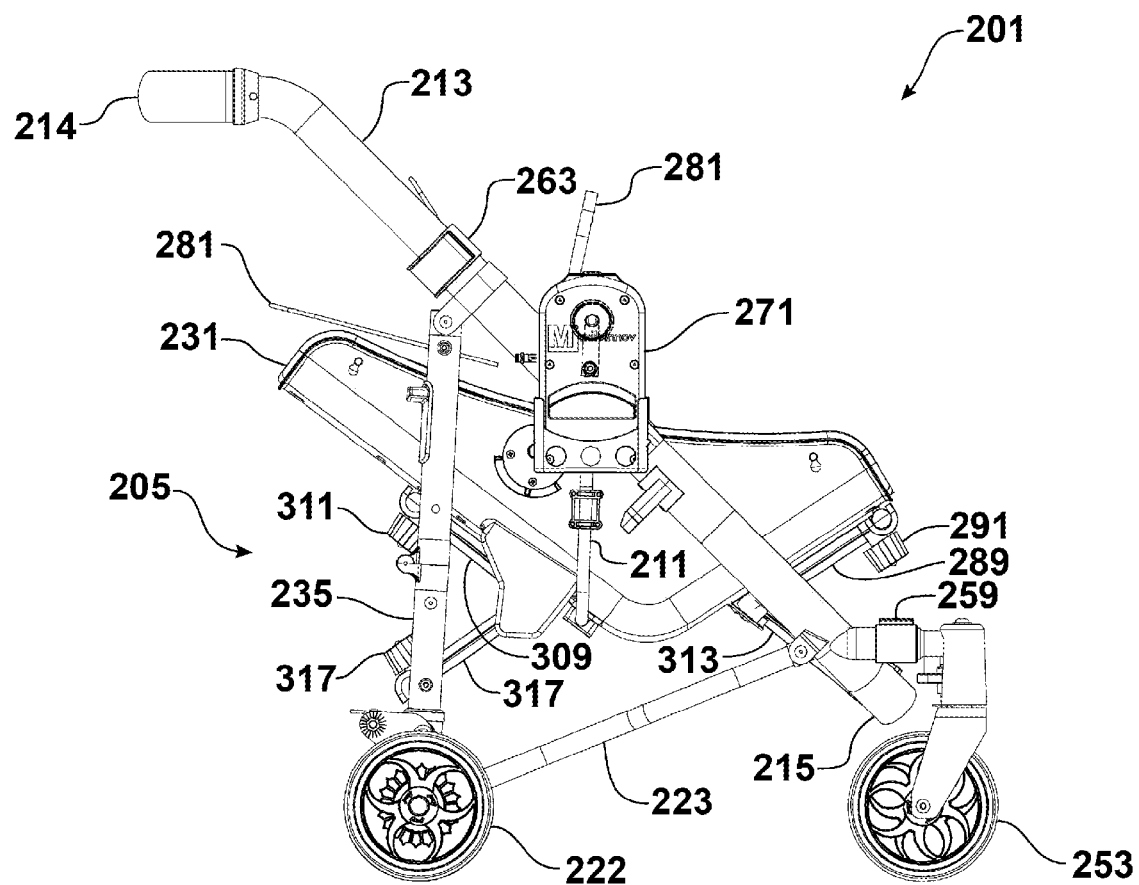
Figure 6:
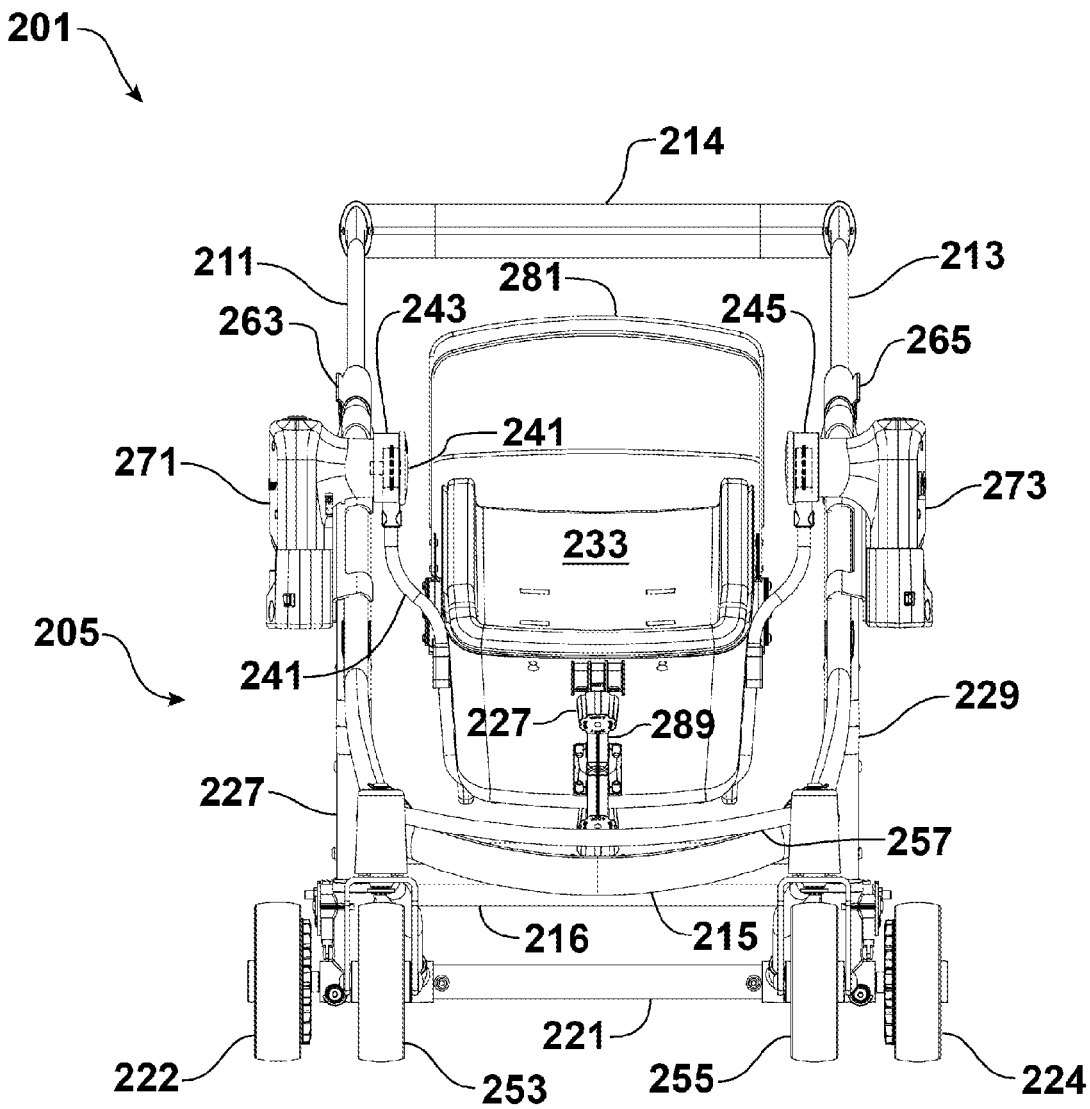
Figure 7:
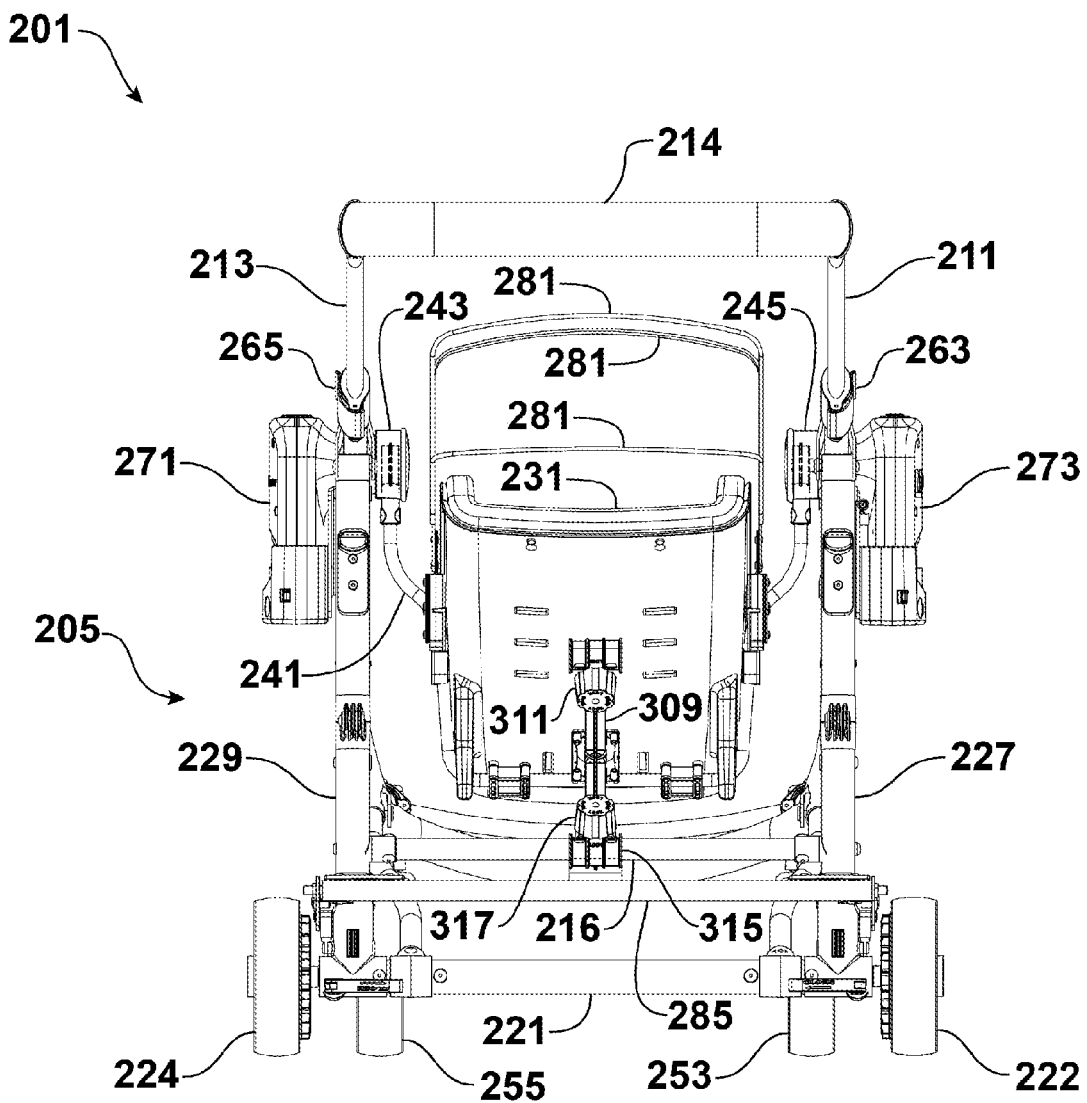
Figure 8:
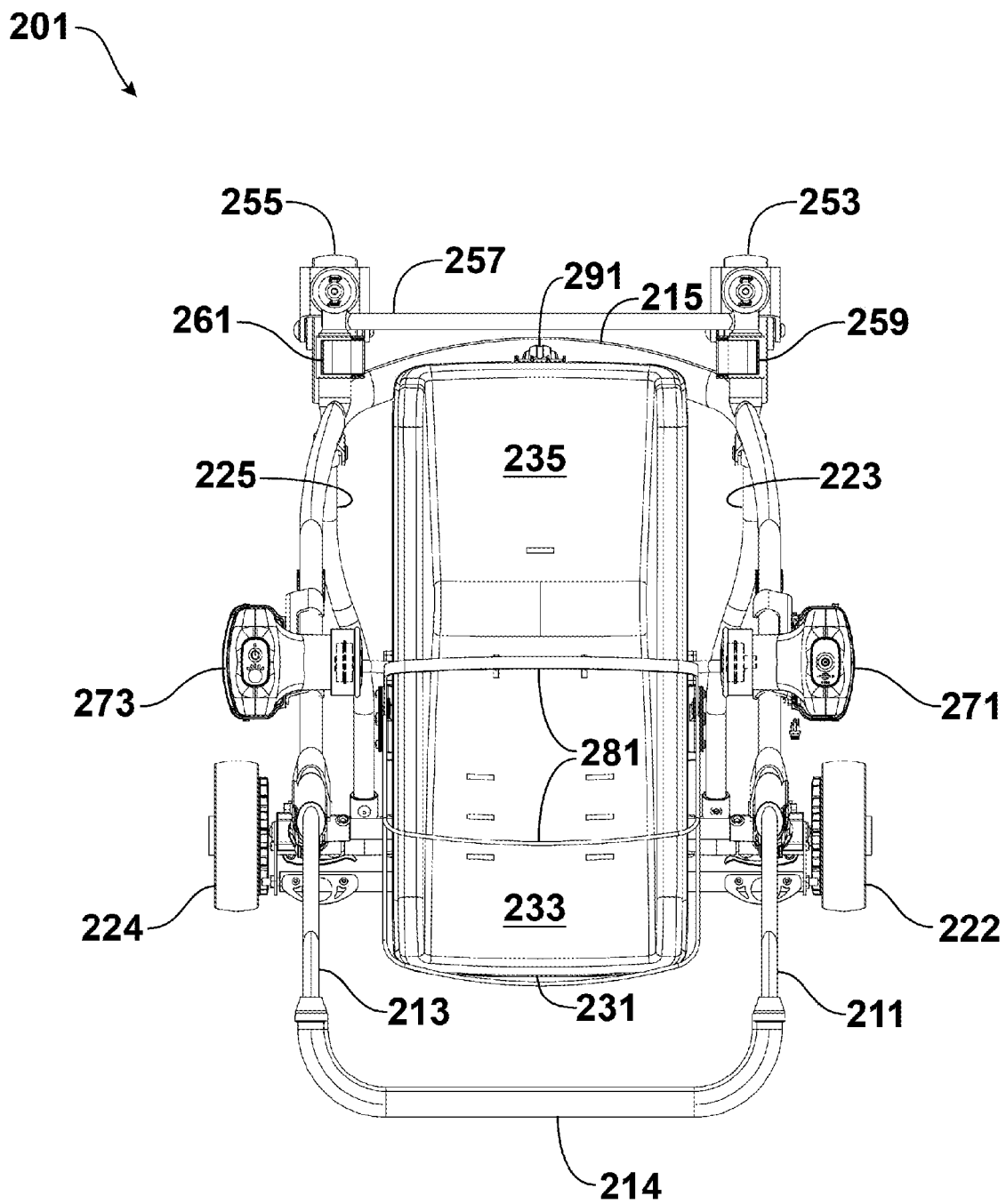
Figure 9:
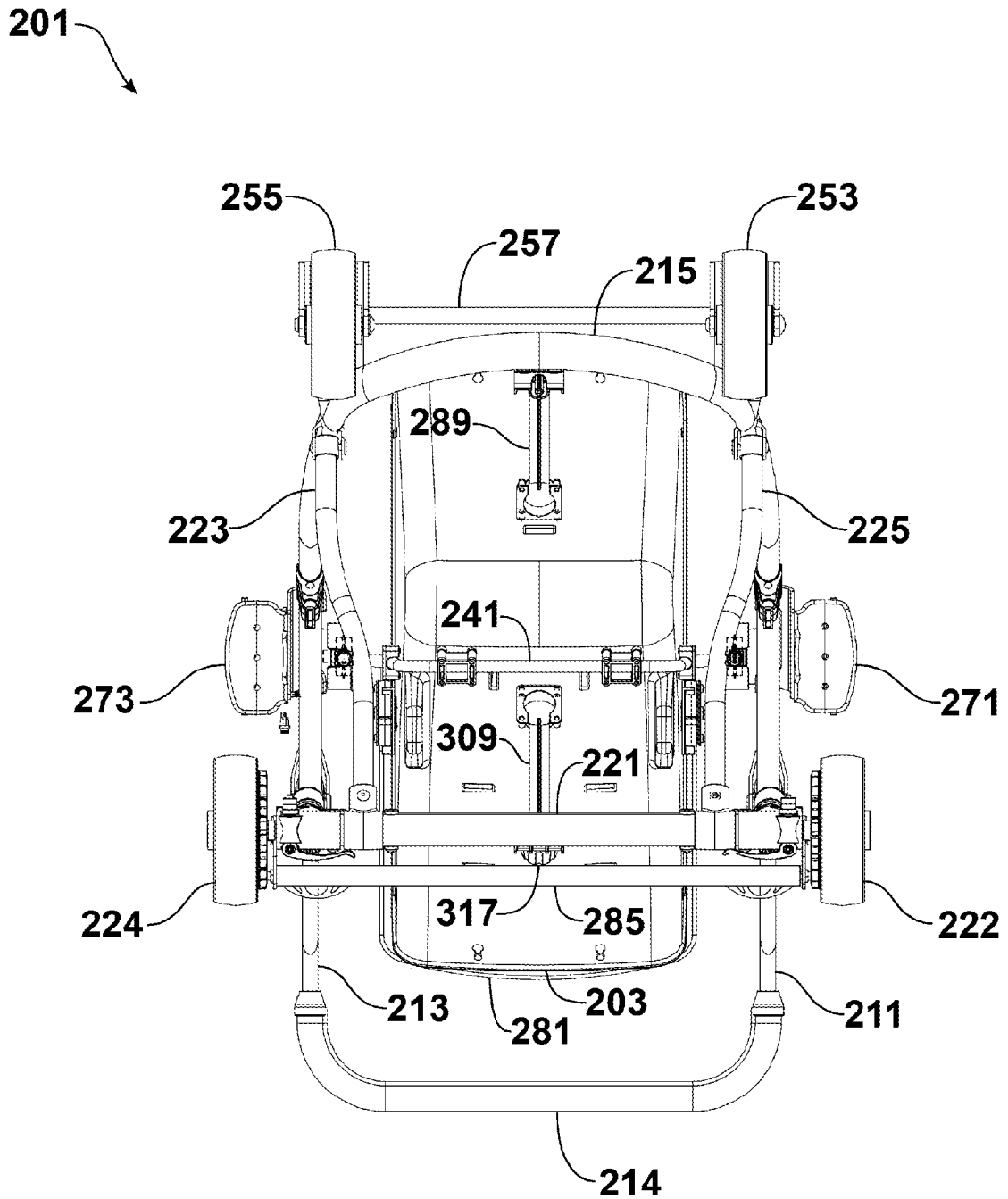

FIGS. 3-9 show a particular, non-limiting embodiment of a stroller in accordance with the teachings herein. As seen therein, the stroller 201 includes an upper frame 203 and a lower frame 205. The upper frame 203 includes first 211 and second 213 struts which are joined at the first ends thereof by way of a handle 214, and which are joined at the second ends thereof by way of an arcuate cross-element 215. The lower frame 205 includes a rear axle 221, first 223 and second 225 serpentine struts, and first 227 and second 229 vertical struts. The first 223 and second 225 serpentine struts are adjoined at first ends thereof to the rear axle 221, and are adjoined at second ends thereof to the first 211 and second 213 struts of the upper frame 203, respectively, at a lower portion thereof. The first 227 and second 229 vertical struts are adjoined at first ends thereof to the rear axle 221. The first 227 and second 229 vertical struts are adjoined at second ends thereof to the first 211 and second 213 struts of the upper frame 203, respectively, at an upper portion thereof. The first 227 and second 229 vertical struts are adjoined adjoined at an intermediate portion by a rear cross element 230. The rear axle 221 has first 222 and second 224 rear wheels rotatably attached thereto.

The stroller 201 further includes a seat 231 having an upper portion 233 and a lower portion 235. The seat 231 is mounted on the upper frame 203 by way of a support element 241 that extends underneath the seat 231 and engages first 243 and second 245 pivots that are disposed, respectively, on the first 211 and second 213 struts of the upper frame 203.

The stroller 201 is further equipped with a front wheel assembly 251 comprising a first front wheel 253 and a second front wheel 255 which are adjoined by a lateral strut 257. The front wheel assembly 251 is releasably attached to the upper frame 203 by way of first 259 and second 261 snap-activated couplers, which allows the front wheel assembly 251 to be readily swapped out for other wheel assemblies. Similarly, the handle 214 is attached to the first 211 and second 213 struts of the upper frame 203 by third 263 and fourth 265 snap-activated couplers, respectively, which allow the handle 214 to be readily swapped out for other handles. The first 259, second 261, third 263 and fourth 265 snap-activated couplers also facilitate at least partial disassembly of the stroller 201 for storage purposes.

The particular embodiment depicted in FIGS. 3-9 includes first 271 and second 273 motors which are mounted, respectively, on the first 211 and second 213 struts of the upper frame 203. The first 271 and second 273 motors drive the first 243 and second 245 pivots, thus imparting a swinging motion to the seat 231. In some embodiments, only a single motor 251 may be utilized to drive one of the first 243 and second 245 pivots for this purpose. Either or both of the first 271 and second 273 motors may be equipped with a suitable control interface to control the operation thereof. The control interface may comprise one or more panels, displays and/or keypads, and may be equipped with suitable logic, in the form of software or hardware, so that it is programmable and/or capable of implementing various modes of operation. For example, the control interface may be adapted to swing the seat 231 in a slow, rhythmic manner so as to induce sleep, or with gradually reducing or increasing frequency.

The upper frame 203 is further equipped with canopy support elements 281 to support a canopy (not shown) over the seat 231. The canopy support elements 281 may be adjustable, thus allowing the canopy to manipulated into a more open or closed configuration. Various clips, bands, or other provisions may be utilized to secure the canopy to the canopy support elements 281.

A foot brake 283 is positioned on the rear of the stroller 201, where it may be readily operated by someone pushing the stroller. In the particular embodiment depicted, the brake includes a horizontal bar 285 that may be pressed downward to engage the brake, thus maintaining the stroller 201 in a stationary position. The horizontal bar 285 may also be utilized to release the brake. In some embodiments, this may be achieved by double pressing the horizontal bar 285, or by lifting the horizontal bar 285 upward.

The stroller 201 is further equipped with adjustable front 287 and rear 289 seat locking mechanisms, which provide the user with the ability to lock the seat 231 in place, and/or to limit the amplitude of the swinging motion towards the front or rear of the stroller. The front 287 seat locking mechanism comprises a first track 289 which is adjustably attached to an exterior surface of the lower portion 235 of the seat 231 by way of a first rotatable knob 291. The front seat locking mechanism 287 further comprises a second track 293 having a clasp 295 attached thereto which releasably engages the arcuate cross-element 215, and whose position along the length of the second track 293 is adjustable by way of a second rotatable knob 297. Similarly, the rear seat locking mechanism 307 comprises a third track 309 which is adjustably attached to an exterior surface of the upper portion 233 of the seat 231 by way of a third rotatable knob 311. The rear seat locking mechanism 307 further comprises a fourth track 313 having a clasp 315 attached thereto which releasably engages the arcuate cross-element 215, and whose position along the length of the fourth track 313 is adjustable by way of a fourth rotatable knob 317.

Figure 10:
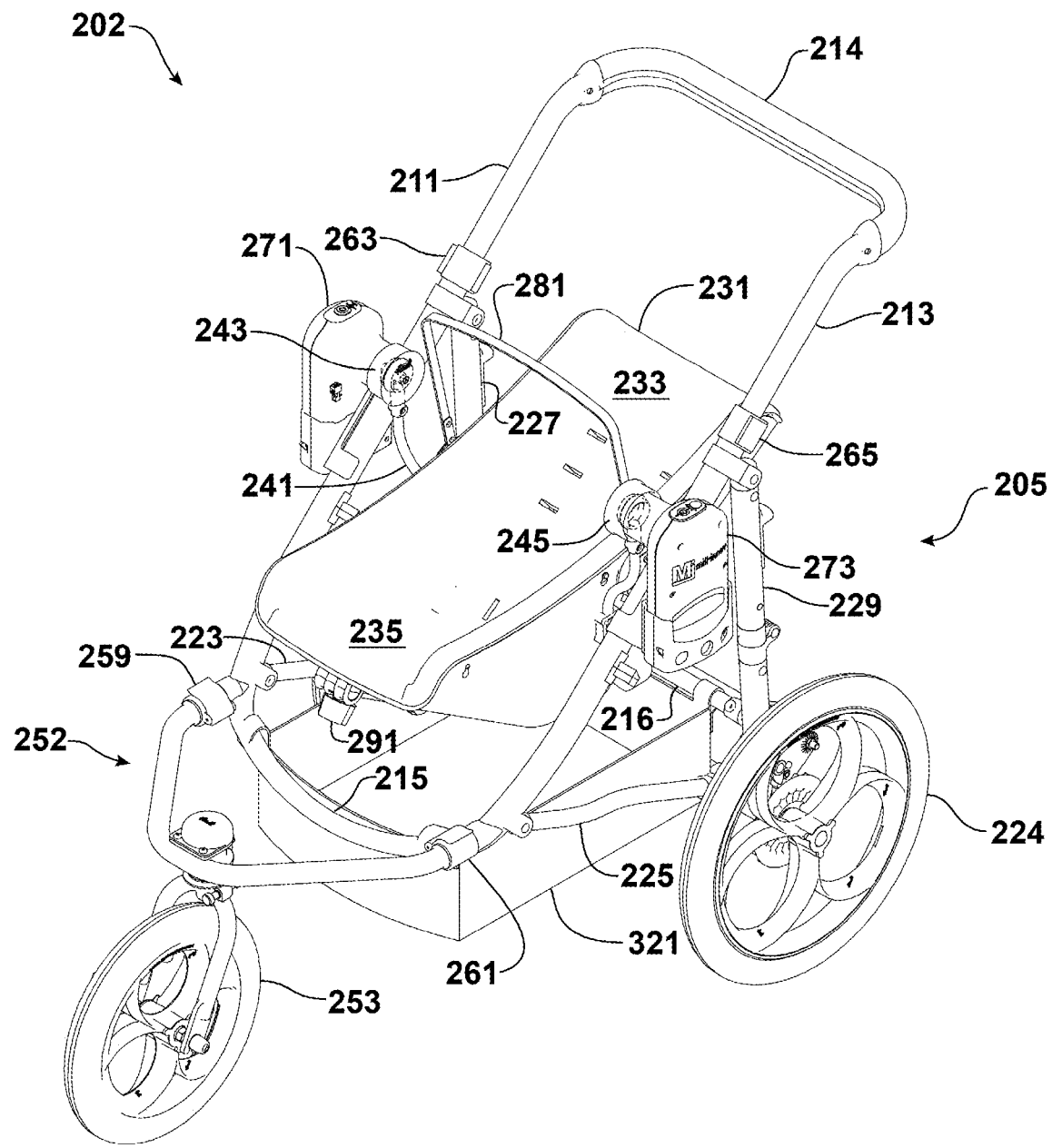
FIGS. 10-16 are illustrations of a second embodiment of a stroller in accordance with the teachings herein.
Figure 11:
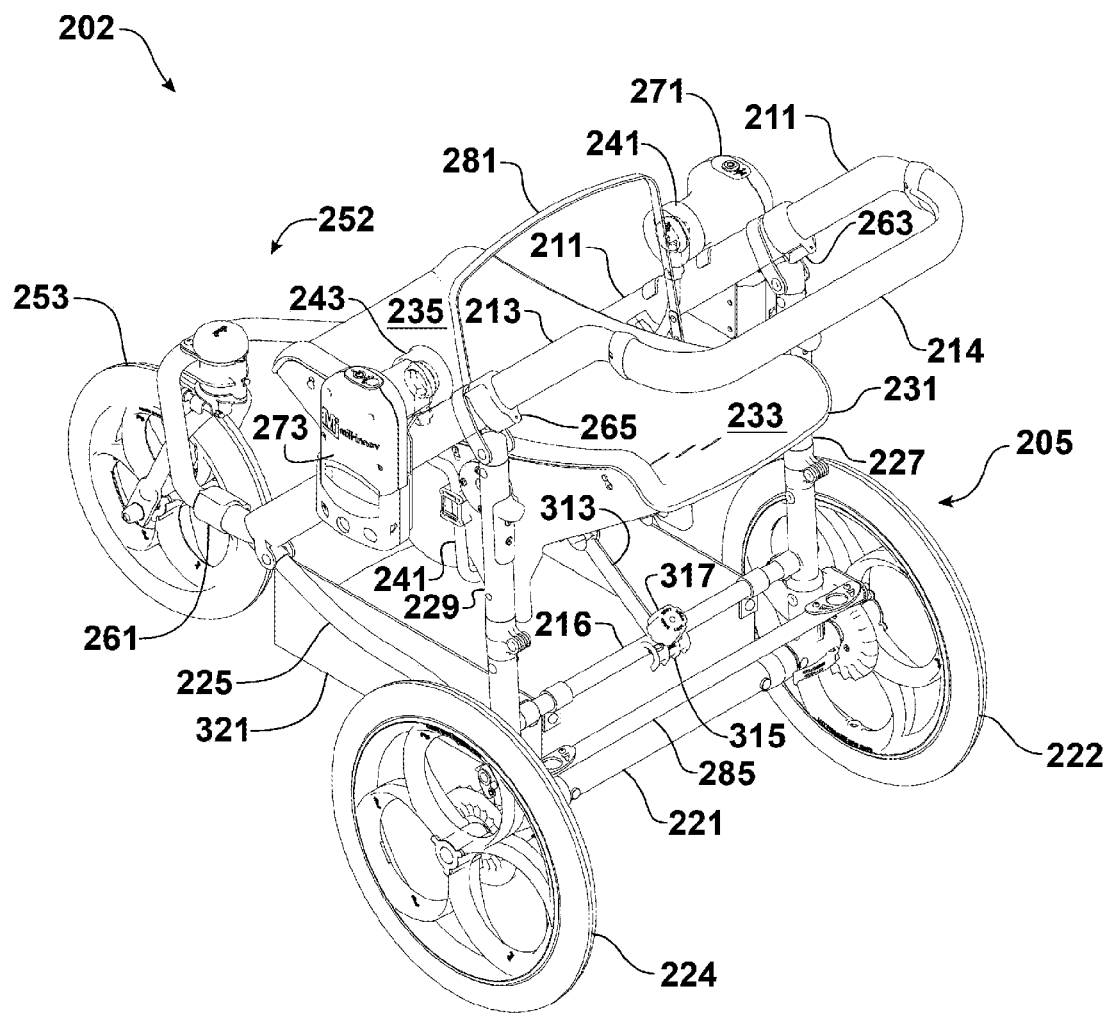
Figure 12:
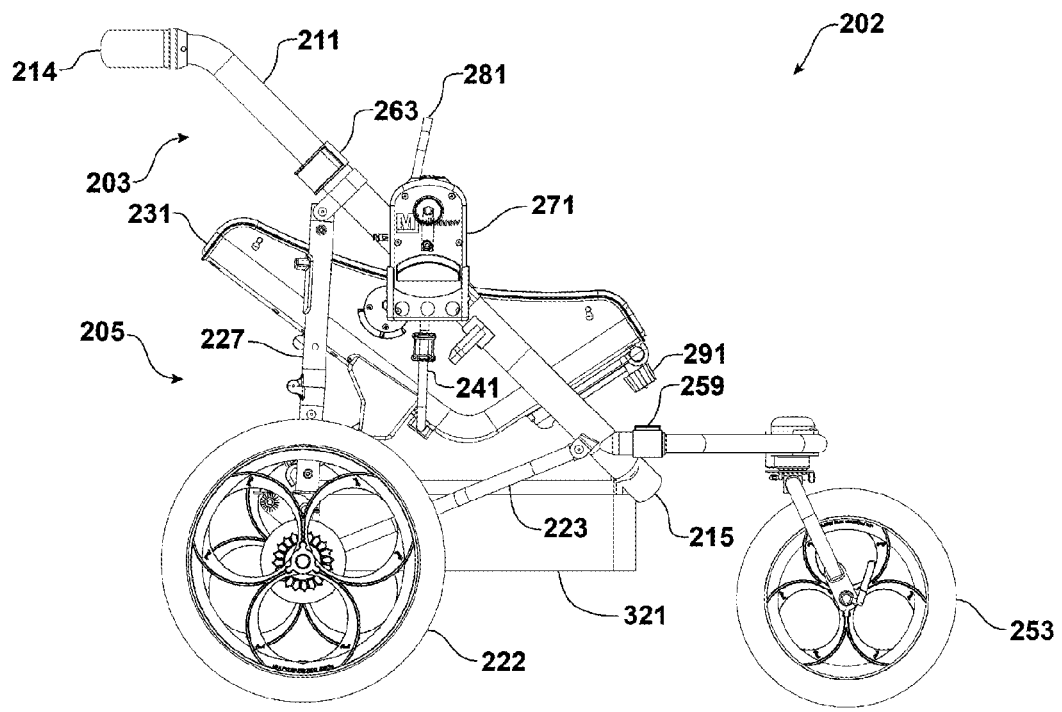
Figure 13:
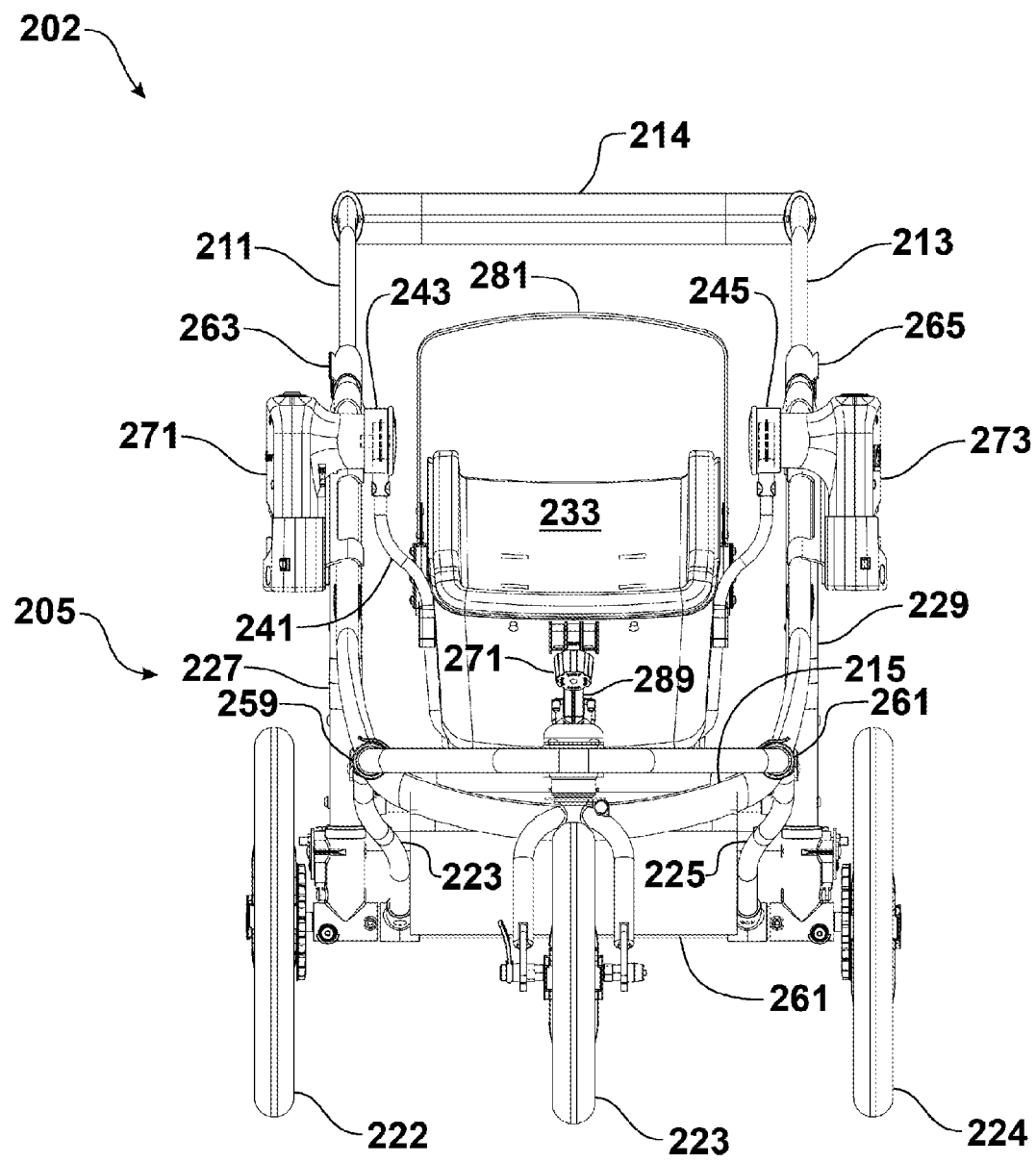
Figure 14:
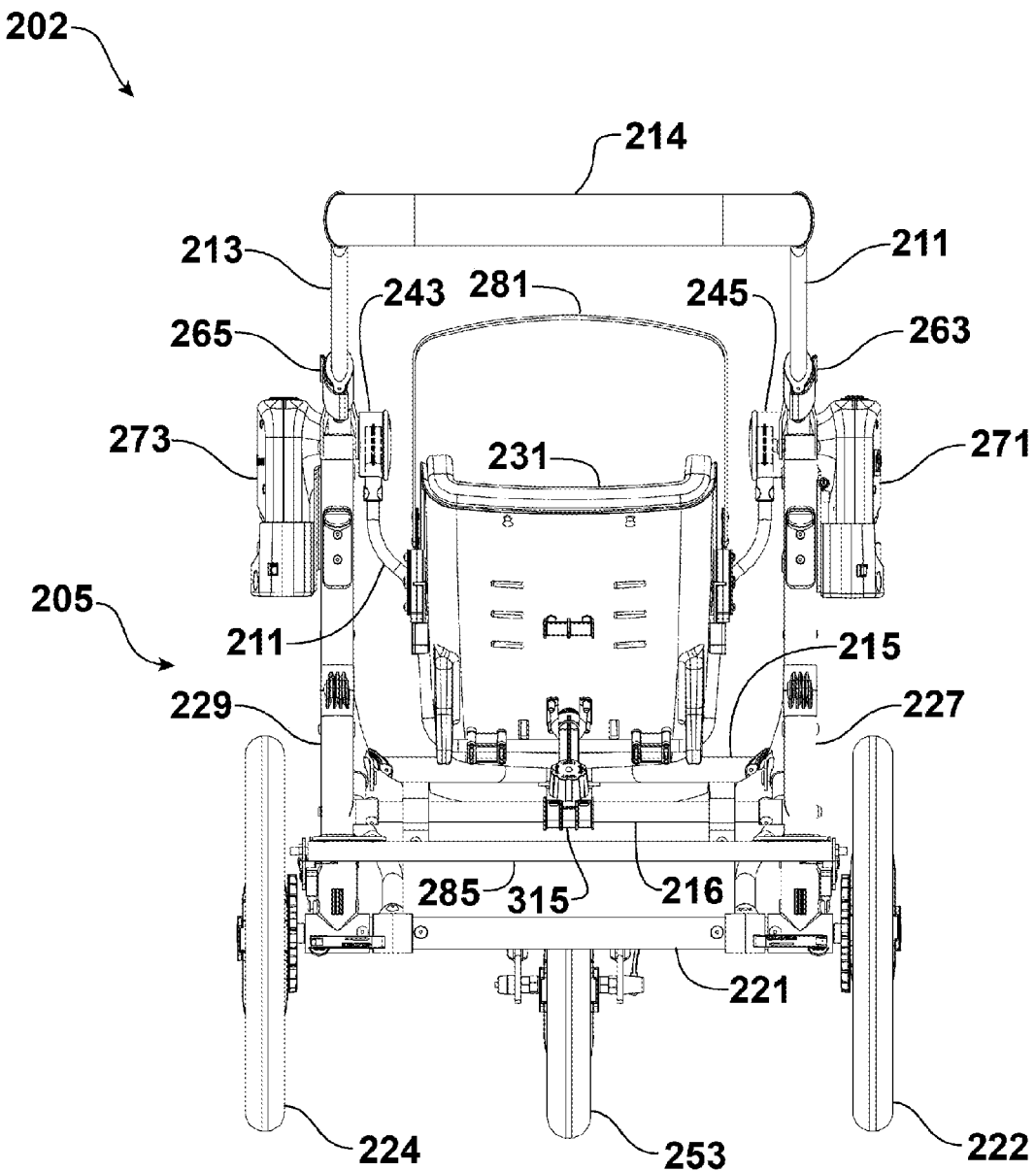
Figure 15:
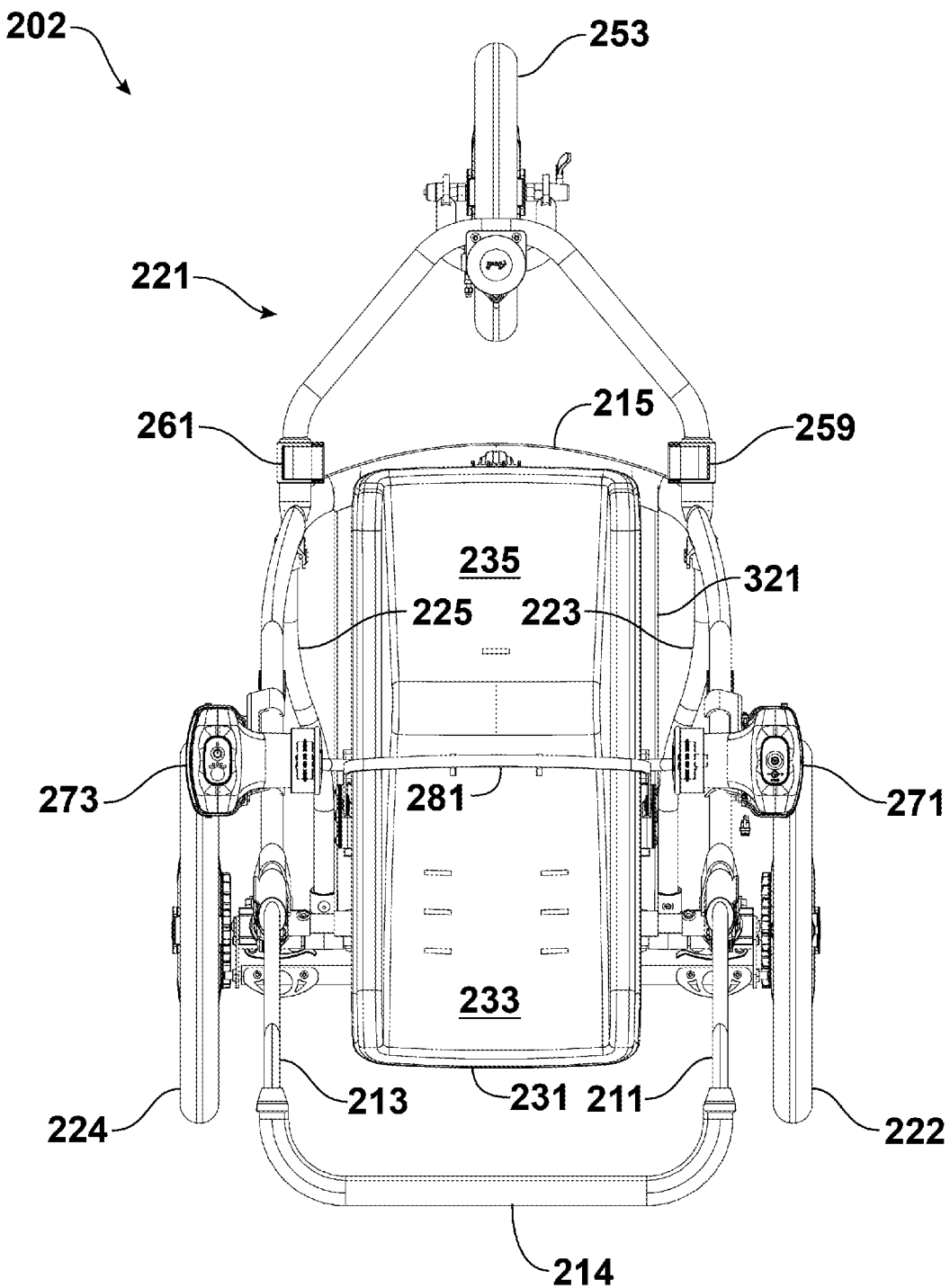
Figure 16:
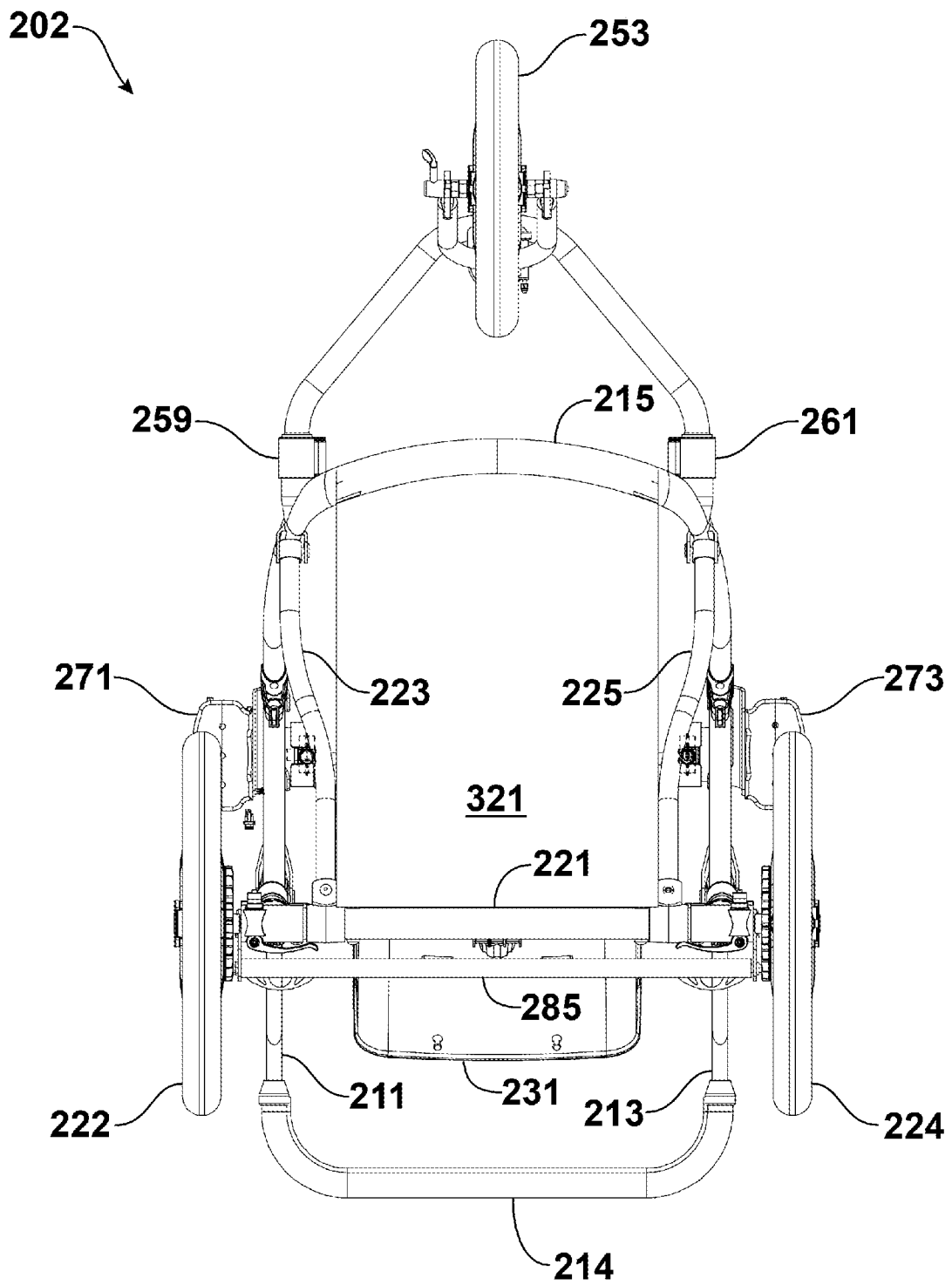

FIGS. 10-16 illustrate a second particular, non-limiting embodiment of a stroller in accordance with the teachings herein. The stroller 202 depicted is similar in most respects to the first embodiment, but has a three-wheel configuration consisting of first 222 and second 224 rear wheels and a single front wheel 253. Such a wheel configuration may be more conducive to use in conjunction with certain activities, such as jogging. The wheels 222, 224 and 253 on the stroller 202 in this embodiment are preferably larger in diameter than the stroller 201 of the first embodiment, and are preferably mounted via quick disconnect levers and/or push pins. In an especially preferred embodiment, the quick disconnect levers and/or push pins are pressure activated by pressing on the wheel hubs or a portion thereof.

The stroller 201 of the first embodiment and the stroller 202 of the second embodiment have numerous advantages. For example, the configurations of the first 211 and second 213 support elements allow the seat 203 to be readily removed from the chassis and reattached in the opposite orientation (e.g., facing backwards instead of forwards).

The stroller of FIGS. 10-16 is further equipped with a storage compartment 321, which may be made out of a mesh, cloth or other suitable materials. Two corners of the storage compartment 321 are attached to the arcuate cross element 215, and two corners are attached to the rear cross element 230.

Several variations and modifications are possible to the foregoing embodiments. For example, the seat may be replaced with a larger (preferably non-swingable) seat that attaches to the existing chassis. This feature allows the stroller to be modified to accommodate a larger child so that the stroller does not have to be replaced as the child grows.

In addition, in some embodiments, the strollers disclosed herein may be further equipped with one or more trays. Such trays may be provided with a series of indentations adapted to hold beverages (e.g., bottles) or other such items, and may depend from the upper frame by way of one or more connectors. In some embodiments, the connectors may be rotatably connected to the upper frame in such a way that the tray is maintained in a horizontal position by gravity independently of the orientation of the stroller.

Moreover, in some embodiments, the motor(s) may be battery powered. In such embodiments, a gearing mechanism may be provided which is activated by the motion of the stroller wheels, and which recharges the batteries which power the motor. This feature allows the batteries to be recharged through normal use of the stroller.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A stroller, comprising:
a chassis having first and second opposing frame elements, wherein said chassis is supported on a plurality of wheels;
a seat suspended from said chassis by way of a support element, wherein said seat includes upper and lower portions and is adapted to accommodate a child such that the back of the child rests against the upper portion and such that the legs of the child rest against the lower portion, wherein said support element has first and second ends which are rotatably attached to first and second pivots mounted, respectively, on said first and second frame elements, wherein said first pivot rotates about a first axis, and wherein said seat is disposed between said first axis and said plurality of wheels; and a first motor which rotates said first pivot;
wherein said support element includes first and second opposing portions which are connected by a third portion, wherein said first and second portions are attached to said first and second pivots, respectively, and wherein said third portion extends underneath said seat.

2. The stroller of claim 1, wherein said support element extends under said seat.

3. The stroller of claim 1, wherein said seat has first and second opposing major surfaces, wherein said first major surface includes said upper and lower portions, and wherein said support element is mounted on said second major surface.

4. The stroller of claim 1, wherein said first and second pivots rotate about a common axis.

5. The stroller of claim 1, wherein said second pivot rotates about a second axis, and wherein said second axis is parallel to said first axis.

6. The stroller of claim 1, wherein said seat is disposed between said plurality of wheels and a plane containing said first axis.

7. The stroller of claim 1, wherein said support element is U-shaped.

8. The stroller of claim 1, wherein said support element includes first and second arcuate portions.

9. The stroller of claim 1, wherein said support element extends under the middle of said seat.

10. The stroller of claim 1, further comprising a second motor, wherein said first and second motors are mounted, respectively, on first and second opposing frame elements.

11. The stroller of claim 1, further comprising a handle attached to a first end of said first and second frame elements.

12. The stroller of claim 10, further comprising a first axle having first and second joints disposed on first and second ends thereof, wherein a second end of said first frame element is attached to said first joint, and wherein a second end of said second frame element is attached to said second joint.

13. The stroller of claim 12, wherein said plurality of wheels includes first and second wheels which are attached, respectively, to first and second joints.

14. The stroller of claim 13, wherein said first and second wheels include wheel locks.

15. The stroller of claim 1, further comprising a second axle having third and fourth wheels disposed, respectively, on first and second ends thereof.

16. The stroller of claim 15, further comprising a first strut having a first end which is attached to said first frame element, and having a second end which is attached to said second axle.

17. The stroller of claim 16, further comprising a second strut having a first end which is attached to said second frame element, and having a second end which is attached to said second axle.

18. The stroller of claim 15, further comprising:
a first crossbar having a first end which is attached to said first frame element, wherein said first crossbar has a second end which is attached to said first strut; and
a second crossbar having a first end which is attached to said second frame element, wherein said second crossbar has a second end which is attached to said second strut.

19. The stroller of claim 1, wherein said stroller is transformable between a first state and a second state, wherein said second state is in a more compact arrangement in said second state as compared to said first state, and further comprising a spring activated lock disposed on said first frame element which locks the stroller in said first state, and wherein said lock further includes a button which may be pressed to disengage the lock, thus allowing said stroller to be placed in said second state.

20. The stroller of claim 1, wherein said seat moves in a swinging motion when said first motor is activated.

* * * * *